(12) United States Patent
Shirvan

(10) Patent No.: US 6,439,340 B1
(45) Date of Patent: Aug. 27, 2002

(54) ACOUSTICALLY TREATED STRUCTURALLY REINFORCED SOUND ABSORBING PANEL

(75) Inventor: Shawn S. Shirvan, Foothill Ranch, CA (US)

(73) Assignee: Astech Manufacturing, Inc., Santa Ana, CA (US)

(*) Notice: Subject to any disclaimer, the term of this patent is extended or adjusted under 35 U.S.C. 154(b) by 0 days.

(21) Appl. No.: 09/716,120

(22) Filed: Nov. 17, 2000

(51) Int. Cl.[7] .................................. F02K 1/00
(52) U.S. Cl. ..................... 181/213; 181/286; 181/292
(58) Field of Search ............................. 181/213, 214, 181/286, 290, 291, 292, 293, 294

(56) References Cited

U.S. PATENT DOCUMENTS

| | | | | |
|---|---|---|---|---|
| 3,166,149 A | * | 1/1965 | Hulse et al. | 181/292 |
| 4,828,932 A | * | 5/1989 | Morimoto et al. | |
| 5,041,323 A | * | 8/1991 | Rose et al. | 181/292 |
| 6,176,964 B1 | * | 1/2001 | Parente et al. | 181/292 |
| 6,179,086 B1 | * | 1/2001 | Bensemir et al. | 181/292 |

* cited by examiner

Primary Examiner—Khanh Dang
(74) Attorney, Agent, or Firm—Morland C. Fischer

(57) ABSTRACT

An acoustically treated structurally reinforced sound absorbing panel having particular application for use at the inlet cowl of a jet engine to reduce engine noise leaked into the environment. The sound absorbing panel includes a sound receiving chamber having a honeycomb shaped core manufactured from corrugated metallic ribbons. The sound receiving chamber is sandwiched between a metallic backskin at one side thereof, and a metallic face sheet at the opposite side. The face sheet is perforated so that incoming sound waves which represent the engine noise enter the sound receiving chamber within which they are channeled towards and reflected between the metallic backskin and face sheet. An acoustic attenuation medium having a plurality of short metal fibers that are held together by a sintering process is diffusion bonded to the perforated face sheet so that the reflected sound waves which are channeled through the sound receiving chamber are transmitted through and attenuated by the acoustic attenuation medium.

6 Claims, 3 Drawing Sheets

ACOUSTICALLY TREATED STRUCTURALLY REINFORCED SOUND ABSORBING PANEL

BACKGROUND OF THE INVENTION

1. Field of the Invention

This invention relates to a metallic acoustically treated sound absorbing panel having a reinforcing core of the honeycomb type so as to be adapted to withstand mechanical loading. The sound absorbing panel is manufactured to be advantageously capable of preventing galvanic corrosion and avoiding the effects of high temperature so as to prevent disbanding and structural failure. By way of example, the sound absorbing panel of this invention is strategically disposed at the inlet cowl of a jet engine to reduce the level of noise that is emitted from the engine into the environment.

2. Background Art

It is known to use sound absorbing panels within the inlet/exhaust system of a jet aircraft in order to reduce noise pollution which escapes from the engine into the environment. The conventional sound absorbing panels are typically manufactured from substrates of different metals (e.g. stainless steel and aluminum) that are adhesively bonded together during assembly. Because of the manner in which they are manufactured, the conventional sound absorbing panels have been susceptible to undesirable skin and structural failures which may lead to increased maintenance costs and to the possibility that the aircraft may have to be taken out of service.

More particularly, the use of dissimilar metal substrates that have a common interface or junction has been known to cause galvanic coupling which can result in corrosion. Moreover, the adhesive that is employed to bond the metal substrates together is exposed to the same high temperatures to which the exhaust system of the aircraft is exposed. Such corrosion and/or high temperatures correspondingly result in disbanding of the panel and the separation of the metal substrates. What is still more, during routine maintenance of the inlet system, a workman may have to walk over the sound absorbing panel. The weight of the workman and the lack of suitable structural reinforcement sometimes causes the conventional panel to break.

As a consequence of the foregoing, conventional sound absorbing panels are likely to fail which thereby necessitates an inefficient repair and/or replacement.

SUMMARY OF THE INVENTION

Disclosed below is a unique acoustically treated structurally reinforced sound absorbing panel that has particular application for use with the nacelle system (e.g. at the inlet cowl of a jet engine) of a jet aircraft to reduce the magnitude of the noise which escapes into the environment. The sound absorbing panel is manufactured so as to avoid structural failure, disbonding and galvanic corrosion, while being able to better withstand high temperature and mechanical loading.

The sound absorbing panel has a sound chamber comprising a reinforcing core of the honeycomb type that includes corrugated metallic (e.g. stainless steel) ribbons. An array of parallel aligned sound transmitting channels are established through the cells of the honeycomb core. A metallic (e.g. stainless steel) backskin at the bottom of the panel is attached to one side of the sound chamber. A perforated metallic (e.g. stainless steel) face sheet at the top of the panel is attached to the opposite side of the sound chamber. As an important improvement, a porous acoustic attenuation layer is (e.g. diffusion) bonded to the underside of the face sheet so as to lie below the perforations therein. The porous acoustic attenuation layer preferably comprises an arrangement of short metal (e.g. stainless steel) fibers that are held together by means of sintering.

In operation, incoming sound waves corresponding to the jet engine noise enter the sound chamber of the sound absorbing panel by way of the perforations formed in the face sheet and the porous acoustic attenuation layer bonded thereto. The incoming sound waves are then channeled through the parallel aligned cells of the sound chamber (e.g. the reinforcing honeycomb core) to be reflected between the face sheet and the backskin at opposite sides of the panel. In this regard, it should be appreciated that the metallic honeycomb core of the sound chamber serves the important dual functions of providing enhanced structural reinforcement to withstand mechanical loads and guiding the incoming and reflected sound waves between the face sheet and the backskin of the sound absorbing panel. The amplitude of the reflected sound waves that are repeatedly transmitted through the porous acoustic attenuation layer below the face sheet is successively attenuated, whereby to reduce the level of noise which escapes the sound chamber of the panel into the environment.

DETAILED DESCRIPTION

Figure 6:
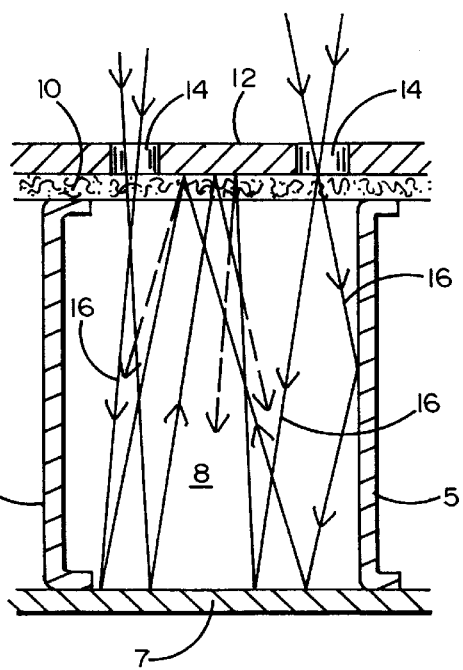
FIG. 6 is a cross-section to illustrate the transmission path of incoming and reflecting sound waves through the sound absorbing panel.
Figure 3:
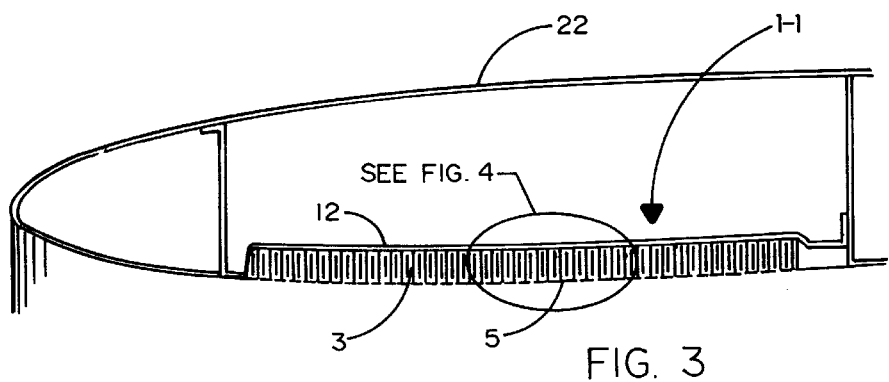
FIG. 3 is a cross-section taken along lines 3—3 of FIG. 2.
Figure 4:
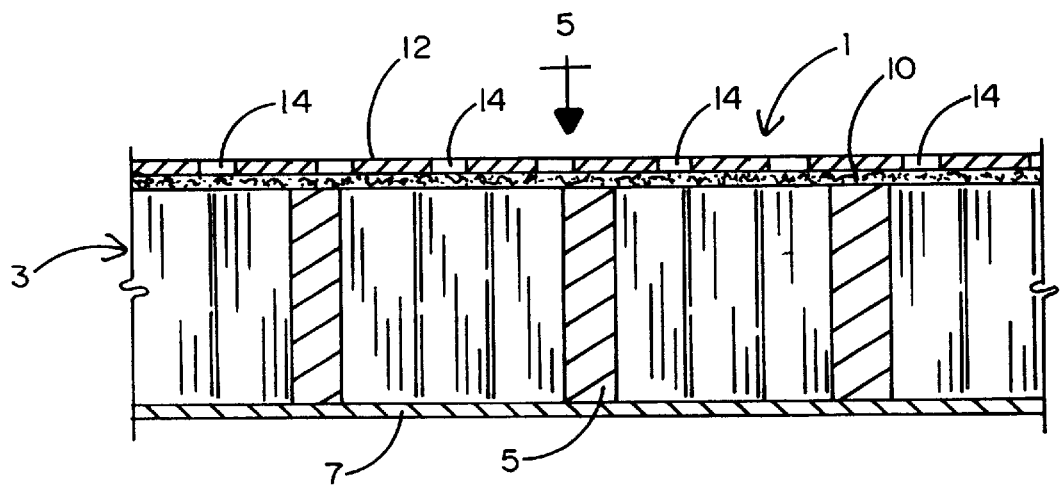
FIG. 4 is a cross-section taken along lines 4—4 of FIG. 5.
Figure 5:
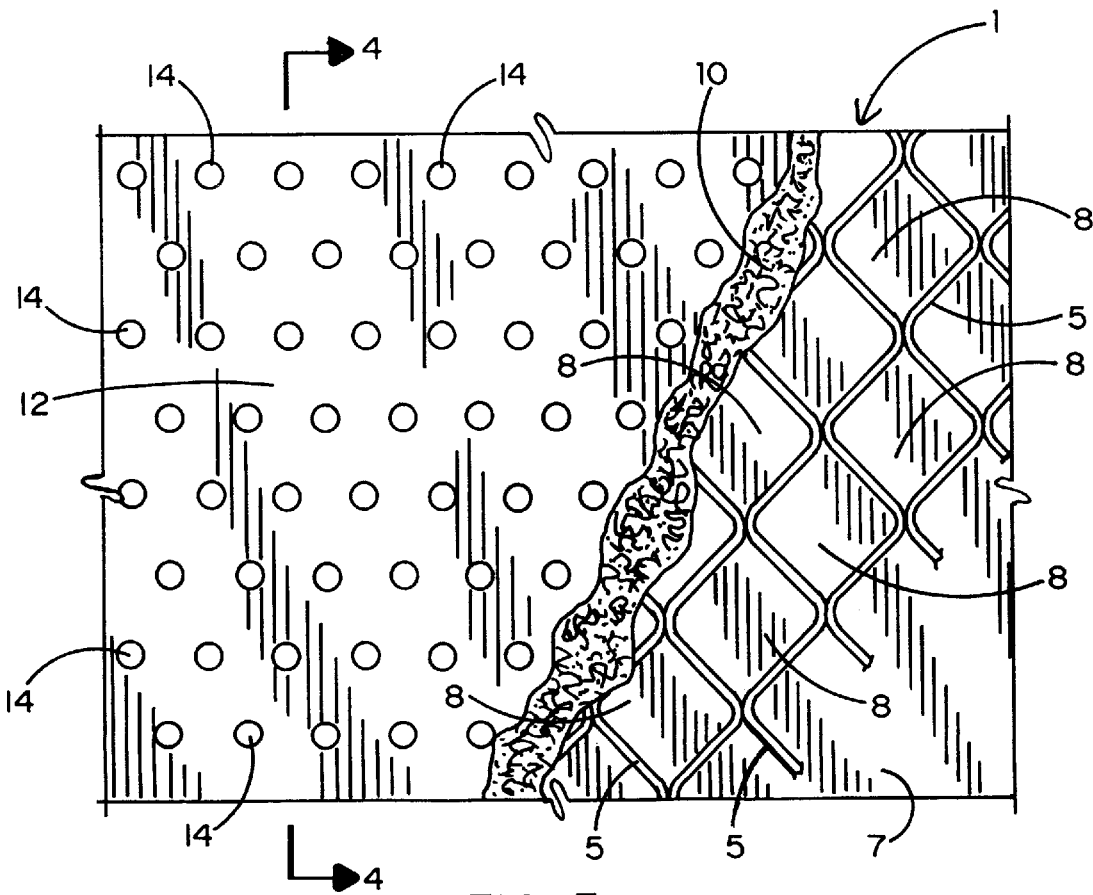
FIG. 5 is a cross-section taken along lines 5—5 of FIG. 4.

Details of the acoustically treated structurally reinforced sound absorbing panel 1 which forms this invention are now disclosed while referring initially to FIGS. 4–6 of the drawings. As will also be disclosed when referring to FIGS. 1–3, the structurally reinforced sound absorbing panel 1 of this invention has particular application for use with the nacelle structures of a jet aircraft (both commercial and military) such as for reducing the audible noise which escapes from a jet engine into the environment. What is even more, by virtue of the soon to be described improved construction of the structurally reinforced sound absorbing panel 1, failures caused by high temperature, mechanical loading, galvanic corrosion and disbonding that have plagued conventional sound absorbing panels in the past can now be largely avoided.

The structurally reinforced sound absorbing panel 1 includes a sound receiving chamber 3 (best illustrated in FIG. 6). The sound receiving chamber 3 is a metallic reinforcing core of the honeycomb type which has a thickness of preferably 0.25 to 2.0 inches (depending upon the use to which panel 1 will be applied). The honeycomb core of sound receiving chamber 3 is manufactured from a plurality of corrugated metallic (e.g. stainless steel) ribbons 5. Reference can be made to U.S. Pat. Nos. 2,910,153 and 2,959,257 issued Oct. 27, 1959 and Nov. 8, 1960, respectively, for a description of a honeycomb core that can be used to form the sound receiving chamber 3 of sound absorbing panel 1. Therefore, the manufacturing details of the honeycomb core will not be described herein.

The honeycomb core described in the patents listed above is employed to manufacture a structural panel with enhanced resistance to mechanical loads. When the honeycomb core is assembled, the individual cells thereof between successive metallic ribbons form parallel aligned channels. As an important improvement in the structurally reinforced sound absorbing panel 1 of this invention, these same parallel aligned channels through the cells of the honeycomb core function not only to reinforce the panel to withstand mechanical loads but also to provide sound guides (designated by reference numeral 8 and best shown in FIGS. 5 and 6) in the sound receiving chamber 3 though which sound waves may be transmitted for an advantage that will soon be described.

According to another important improvement of this invention, the honeycomb core of sound receiving chamber 3 is sandwiched between compatible metallic face and back substrates in order to produce a structurally reinforced acoustic sound absorbing panel 1 that is characterized by improved strength and resistance to both galvanic corrosion and debonding relative to conventional sound absorbing panels. In this manner, the improved panel 1 will have a relatively long life expectancy which necessitates less down time and repair costs to the aircraft to which panel 1 is applied. More particularly, the bottom of the honeycomb sound receiving chamber 3 of sound absorbing panel 1 is covered by a metallic backskin 7. By way of example, the backskin 7 is a sheet that is manufactured from stainless steel. Metallic backskin 7 has a thickness of up to approximately 0.060 inches (depending upon the use to which the acoustic sound absorbing panel 1 will be applied).

The top of the honeycomb core of sound receiving chamber 3 of the structurally reinforced sound absorbing panel 1 is covered by an acoustic attenuation layer 10. The acoustic attenuation layer 10 is a porous sheet that contains an arrangement of short metal (e.g. stainless steel) fibers that are held together by means of a conventional sintering process. The acoustic attenuation layer 10 has a Rayl value of up to 100 CGS and a thickness of up to 0.20 inches depending upon the use to which the acoustic sound absorbing panel 1 will be applied. The density of the porous acoustic attenuation layer 10 must allow incoming and reflected sound waves to pass therethrough in a manner that will be described in greater detail below. A commercially available porous sound attenuation medium that can be used to form layer 10 and that is adapted to be bonded to a metallic substrate is sold under the trademark FELT METAL by Technetics Corporation of DeLand, Fla.

The porous acoustic attenuation layer 10 at the top of the structurally reinforced sound absorbing panel 1 is covered by a perforated metallic face sheet 12. By way of example, the face sheet 12 is manufactured from stainless steel and has a thickness of up to 0.60 inches depending upon the use to which the acoustic sound absorbing panel 1 will be applied. The metallic face sheet 12 and the acoustic attenuation layer 10 are bonded together by means of a conventional diffusion bonding process, or the like. As is best shown in FIG. 5, the face sheet 12 is provided with uniformly spaced round perforations 14 extending thereacross.

It has been found that the density of the perforations 14 should be sufficient to enable face sheet 12 to have a total of up to approximately 30 percent open or void area for a purpose that will soon be described. Moreover, for ideal results, the diameter of the round perforations 14 is selected to be approximately equal to ½ the maximum length of the metallic fibers of the medium used in the manufacture of the porous acoustic attenuation layer 10.

In the assembled panel configuration of FIG. 6, the perforations 14 formed through the metallic face sheet 12 at the top of the improved sound absorbing panel 1 will allow sound waves that are created by the noise from a jet engine to enter an acoustic box via the porous acoustic attenuation layer 10. That is, the sound waves created by the engine noise (represented by the reference lines 16 in FIG. 6) will enter the sound receiving chamber 3 within which the sound guides 8 (shown in FIG. 5) that run along the cells of the honeycomb core channel the sound waves 16 through the chamber 3 so as to be reflected between the metallic backskin 7 along the bottom of sound absorbing panel 1 and the metallic face sheet 12 along the top of panel 1 by way of the porous acoustic attenuation layer 10 that is bonded thereto. The short metal fibers within the acoustic attenuation layer 10 act to dampen the successively reflected sound waves 16, such that the amplitude of the sound waves which escape from the acoustic box into the surrounding environment will be attenuated to levels that can be better tolerated by the human ear, whereby to advantageously reduce noise pollution in areas (e.g. airports) where loud noises are common.

It is important to recognize that the corrugated ribbons 5 of sound receiving chamber 3, backskin 7, acoustic attenuation layer 10, and perforated face sheet 12 of the improved structurally reinforced sound absorbing panel 1 are manufactured from the same metallic material (e.g. stainless steel). Of course, other suitable metallic materials (e.g. nickel, titanium and the like) may also be selected. However, by virtue of the foregoing, galvanic coupling between dissimilar metals (e.g. stainless steel and aluminum) such as those which have been used in conventional sound absorbing panels will be avoided. Therefore, the sound absorbing panel of this invention is better able to avoid the undesirable effects of galvanic corrosion.

In this same regard, the metallic top and bottom layers (i.e. the perforated face sheet 12 and the backskin 7) of the improved sound absorbing panel 1 are bonded to the metallic ribbons 5 of the honeycomb core of sound receiving chamber 3 by means of a conventional resistance welding technique. Therefore, while the top and bottom layers are held under pressure with the honeycomb core sandwiched therebetween, an electric current is conducted through the panel 1, whereby the corrugated metallic ribbons 5 which form the honeycomb core are bonded, one at a time, to the metallic backskin 7 and the face sheet 12. The current generated during the resistance welding process is conducted directly through the porous acoustic attenuation layer 10 that is bonded below the face sheet 12. By virtue of resistance welding the metallic backskin 7 and face sheet 12 to opposite sides of the metallic honeycomb core of sound receiving chamber 3, the use of adhesives, common to conventional sound absorbing panels, is advantageously avoided. Thus, the likelihood that the improved sound absorbing panel 1 will be susceptible to disbonding, a problem often experienced by such conventional sound absorbing panels, is minimized. In fact, it has been found that the improved sound absorbing panel 1 of this invention can withstand temperatures as high as 1100 F. without degradation, because the common practice of adhesively bonding the sound absorbing panel is no longer necessary.

In summary, the overall structural integrity of a sound absorbing panel such as that described above can be increased so as to avoid mechanical failure in cases where the panel is exposed to high temperate or to corrosive conditions or where the panel must support the weight of a workman. Accordingly, the need to repair the improved structurally reinforced sound absorbing panel 1 of this invention and the corresponding cost and inefficiency associated therewith can be advantageously reduced.

The improved structurally reinforced sound absorbing panel 1 that has been described above is typically manufactured in sheet form having a maximum size of about four feet by eight feet. The relatively large sheets are cut into smaller pre-determined patterns which are then placed on a stretch wrap machine to be stretched formed into the desired shape depending upon the location and use to which the sound absorbing panel will be applied. In some cases, several stretch formed component pieces may have to be welded together to build a complete sound absorbing panel having a full 360 degree configuration.

Figure 1:
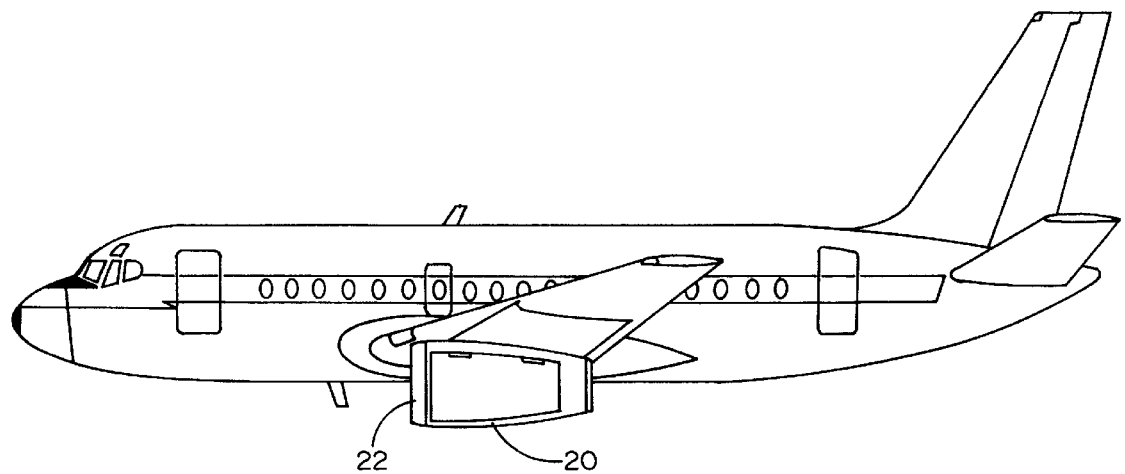
FIG. 1 shows a jet aircraft having a jet engine to which the acoustically treated structurally reinforced sound absorbing panel of this invention may be applied to reduce engine noise which escapes into the environment.
Figure 2:
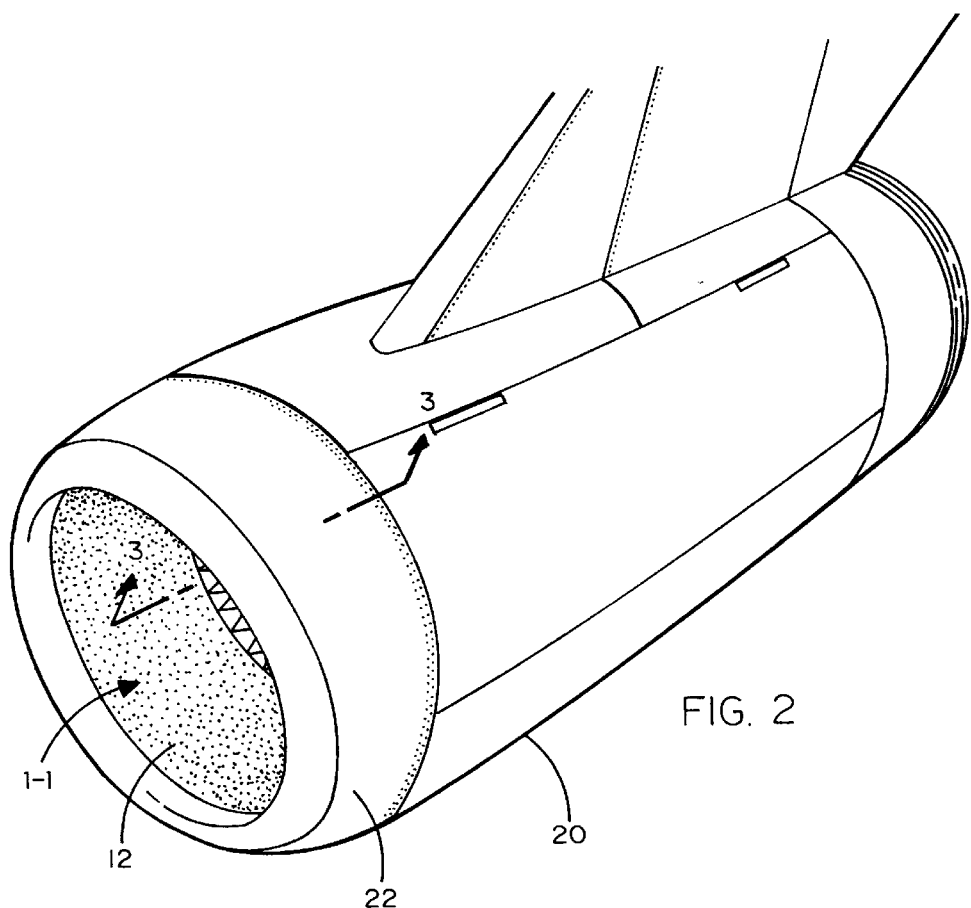
FIG. 2 shows an enlargement of the engine of the jet aircraft of FIG. 1 with the sound absorbing panel located at the inlet cowl thereof.

Turning now to FIGS. 1–3 of the drawings, a particular use of the improved sound absorbing panel is described to acoustically reduce jet engine noise that is leaked into the environment. To this end, a suitably shaped (e.g. round) sound absorbing panel 1—1 having the acoustic box and sound attenuation characteristics as described above while referring to FIGS. 4–6 is located inside the engine 20 of a jet aircraft (shown in FIG. 1). It is preferable that the sound absorbing panel 1—1 be located at the inlet side of the jet engine 20 at which the airflow is received. In particular, and as is best shown by FIGS. 2 and 3, the sound absorbing panel 1—1 of this invention is disposed around the inlet cowl 22 of jet engine 20 with the perforated sound receiving face sheet 12 thereof facing radially inward. Panel 1—1 may be held in place by suitable end brackets, such as those illustrated in FIG. 3 in order to facilitate removal and repair whenever necessary.

Although the sound absorbing panel 1—1 is shown at the inlet cowl 22 of a jet engine 20, it is to be understood that this particular use should not be regarded as a limitation of the present invention. That is to say, the acoustically treated structurally reinforced sound absorbing panel of this invention can have a variety of different shapes so as to be interfaced with other sources of audible noise that incorporate acoustically treated structures in order to attenuate the corresponding sound waves and thereby reduce the level of noise pollution that escapes into the environment.

I claim:

1. In combination:
    a jet engine having an inlet cowl through which incoming air flow is received, said jet engine producing engine noise; and
    a non-adhesively bonded structurally reinforced sound absorbing panel surrounding at least some of the inlet cowl to reduce the engine noise produced by said jet engine and transmitted therefrom into the environment, said sound absorbing panel including:
        first and second metallic sound reflecting substrates spaced one above the other;
        a plurality of perforations formed through the first of said first and second metallic sound reflecting substrates to receive incoming sound waves that represent the engine noise produced by said jet engine;
    a sound receiving chamber comprising a metallic honeycomb shaped core located between said first and second metallic sound receiving substrates to channel the incoming sound waves between said first and second metallic sound reflecting substrates to produce a set of reflected sound waves, and
    a porous sound attenuating medium comprising metal fibers, said sound attenuating medium welded between said metallic honeycomb shaped core and the first of said first and second metallic sound reflecting substrates such that said non-adhesively bonded sound absorbing panel is adapted to withstand high-temperature and disbonding, and the set of reflected sound waves being channeled between said first and second metallic sound reflecting substrates via the honeycomb shaped core of said sound receiving chamber are transmitted through and attenuated by said sound attenuating medium.

2. The combination recited in claim 1, wherein said first and second metallic sound reflecting substrates and the honeycomb shaped core of said sound receiving chamber are manufactured from an identical metallic material.

3. The combination recited in claim 1, wherein the metallic honeycomb shaped core of said sound receiving chamber is also welded to said second metallic sound reflecting substrate.

4. The combination recited in claim 1, wherein each of said first and second metallic sound reflecting substrates is a sheet manufactured from stainless steel.

5. The combination recited in claim 1, wherein each of said first and second metallic sound reflecting substrates, the metallic honeycomb shaped core of said sound receiving chamber, and the metal fibers of said porous sound attenuating medium are manufactured from the same metallic material.

6. The combination recited in claim 1, wherein the metal fibers of said porous sound attenuating medium are bonded together by means of sintering.

* * * * *